United States Patent [19]

Miyabe

[11] Patent Number: 4,491,830
[45] Date of Patent: Jan. 1, 1985

[54] FIRE ALARM SYSTEM

[75] Inventor: Atsushi Miyabe, Kanagawa, Japan

[73] Assignee: Hochiki Kabushiki Kaisha, Tokyo, Japan

[21] Appl. No.: 493,246

[22] Filed: May 10, 1983

Related U.S. Application Data

[63] Continuation-in-part of Ser. No. 208,329, Nov. 19, 1980.

[30] Foreign Application Priority Data

Dec. 1, 1979 [JP] Japan .......................... 54-166929[U]

[51] Int. Cl.³ ....................... G08B 17/00; G08B 17/10
[52] U.S. Cl. .................................. 340/584; 340/518; 340/531; 340/628
[58] Field of Search ............... 340/584, 628, 629, 630, 340/531, 518, 870.28, 870.29

[56] References Cited

U.S. PATENT DOCUMENTS

| | | | |
|---|---|---|---|
| 3,488,586 | 1/1970 | Watrous et al. | 455/612 |
| 3,805,066 | 4/1974 | Chijuma et al. | 340/630 |
| 3,882,477 | 5/1975 | Mueller | 340/584 |
| 4,089,584 | 5/1978 | Polczynski | 455/612 |
| 4,161,651 | 7/1979 | Sano et al. | 455/612 |
| 4,203,326 | 5/1980 | Gottlieb et al. | 340/584 |
| 4,206,449 | 6/1980 | Galvin et al. | 340/518 |
| 4,224,611 | 9/1980 | Münstedt | 340/629 |
| 4,290,146 | 9/1981 | Adolfsson et al. | 455/612 |
| 4,292,628 | 9/1981 | Sadler | 340/531 |
| 4,379,290 | 4/1983 | Muggli et al. | 340/629 |

Primary Examiner—Glen R. Swann, III
Attorney, Agent, or Firm—Max Fogiel

[57] ABSTRACT

A plurality of fire detectors for detecting a physical change caused by fire and a central signal station for receiving a fire signal from the fire detectors to raise an alarm are connected to each other through optical fiber cables. The central signal station transmits power light for supplying power and timing signals which are superposed on the power light for controlling operation timing to the respective detectors through the optical fiber cables, while each of the fire detectors converts the power light into electric power, carries out a fire detecting operation in response to the timing signals and transmits, upon detection of a fire, a fire signal in the form of light to the central signal station through the optical fiber cable.

11 Claims, 13 Drawing Figures

FIRE ALARM SYSTEM

CROSS-REFERENCE TO A RELATED APPLICATION

The present application is a continuation-in-part of copending application Ser. No. 208,329 filed Nov. 19, 1980.

BACKGROUND OF THE INVENTION

1. Field of the Invention

This invention relates to a fire alarm system, and more particularly to a fire alarm system wherein both power supply from a central signal station to fire detectors and transmission of a fire detection signal from the fire detectors to the central signal station are carried out by way of an optical transmission line using an optical fiber cable.

2. Description of the Prior Art

Recently, an optical fiber cable has been put to use in the field of a fire-guard system, with the advance of mass-production technique and application technique of the optical fiber cables.

The optical fiber cable has such an advantage that it enables signal transmission free from an electrical disturbing influences which have been problems to be solved in this field. By employing the optical fiber cable, a misoperation due to an electrical disturbance such as a strong electric field, a thunder surge, etc. can be eliminated. The optical fiber cable further has an advantage in heat resistance and corrosion resistance, as compared with conventional signal lines.

However, in the conventional fire alarm system, the optical fiber cable has been used only for signal transmission of a fire detection signal from a fire detector to a central signal station.

In this connection, it is to be noted that, in an ionization type smoke detector, power must be supplied to the detector from the central signal station, and, in general, a power supply line is used as a signal line, too. However, in the case where the optical fiber cable is used as the signal line, each of the detectors must be provided with a power source therein or a special line for power supply must be additionally provided according to a conventional technique. Thus, there have heretofore been caused such problems that the formation of the system is made complicated and the cost for installation of the system is increased by the employment of the optical fiber cables.

In the field of a measuring system, there has been proposed an arrangement in which a central station transmits an energy after converting it into light to a terminal equipment through an optical fiber cable and the terminal equipment converts the light into electric power to operate circuits contained therein for carrying out measurement and transmits the obtained data to the central station after converting it into light. In the measuring system, generally, a single terminal equipment is connected to the central station. Therefore, it is easy to transmit sufficient power light from the central station to the terminal.

However, in case of fire alarm system, a considerable number of detectors are connected to a single central station and the detectors are disposed remote from each other. By this reason, it is difficult to transmit sufficient light to the detectors simultaneously to operate them. Thus, the technique of the measuring system cannot be applied as it is to the field of fire alarm system.

OBJECTS OF THE INVENTION

It is an object of the present invention to provide a fire alarm system in which power supply and signal transmission between a central signal station and fire detectors are carried out through an optical transmission means using an optical fiber cable which is free from external electrical disturbances such as thunder surge etc. involved in the conventional fire alarm system, and which is capable of preventing a misoperation due to such external disturbances.

It is another object of the present invention to provide a fire alarm system which is capable of omitting a special power line for the fire detectors, thereby to avoid complication of the formation of the system and increase of the cost for installation which are involved in the employment of an optical fiber cable in the alarm system.

It is a further object of the present invention to provide a fire alarm system which is capable of obtaining sufficient power to operate detectors from weak light and capable of transmitting both the energy and signal through an optical fiber cable even if a considerable number of fire detectors are connected to a single central signal station.

SUMMARY OF THE INVENTION

In accordance with the present invention, there is provided a fire alarm system comprising fire detectors for detecting a physical change caused by fire and a central signal station connected to the fire detectors so as to receive a fire signal from the detectors to raise an alarm, which system is characterized in that said central signal station and said fire detectors are connected to each other through optical fiber cables; said central signal station includes a light source for transmitting power light superposed with timing signals to said detectors through the optical fiber cables, a fire signal detecting circuit for detecting a fire signal by converting a fire signal light transmitted from said detector through said optical fiber cable into an electric signal, an alarm indicating circuit to be operated by the fire signal for giving the alarm of fire and a d.c. power source for supplying power to the light source and the circuits in the central signal station; said fire detectors each include a power source section comprised of a photoelectric converter for converting said power light into an electric amount, a booster circuit for boosting the output from said photoelectric converter and a back-up battery, a fire detecting section for detecting a physical change caused by fire and outputting a fire signal, a fire signal transmitting section for converting said fire signal into fire signal light and transmitting said fire signal light to the central signal station and a timing control section for detecting said timing signals and controlling the operation timing of said fire detecting section and said fire signal light transmitting section.

DESCRIPTION OF THE EMBODIMENTS

A fire alarm system of the present invention includes a plurality of fire detectors (hereinafter referred to as "detectors") and a central signal station connected to each other through optical fiber cables. The central signal station transmits power light superposed with timing signals to the respective detectors to supply power thereto and the detectors transmit fire signal light to the central signal station. The connection between the central signal station and the fire detectors according to the present invention is carried out in a manner as illustrated in FIGS. 1 or 2.

Figure 1:
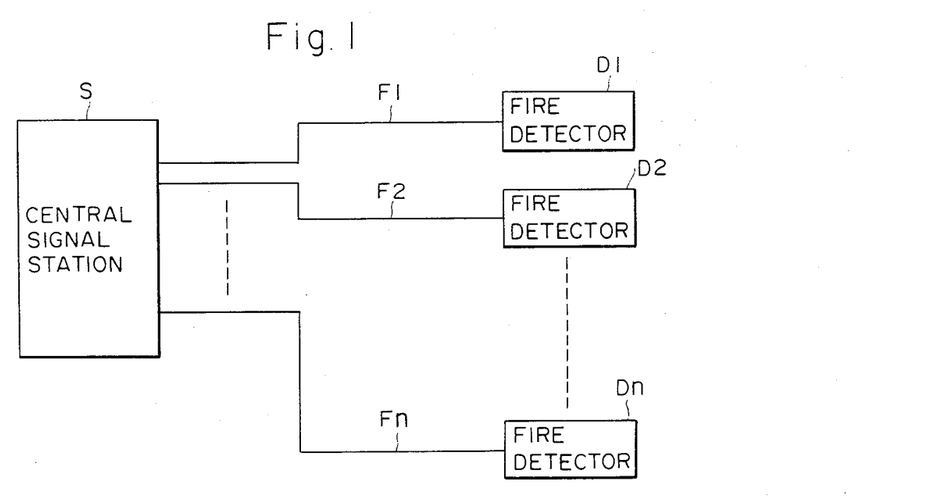
FIG. 1 is a block diagram showing one example of connection mode between a central signal station and fire detectors of a fire alarm system according to the present invention.

In FIG. 1, a central signal station S is connected to detectors $D_1, D_2 \ldots D_n$ through a plurality of optical fiber cables $F_1, F_2 \ldots F_n$, respectively. Each of the optical fiber cables $F_1, F_2 \ldots F_n$ is formed of an optical fiber cable for power light and an optical fiber cable for signal light as will be described in detail later.

Figure 2:
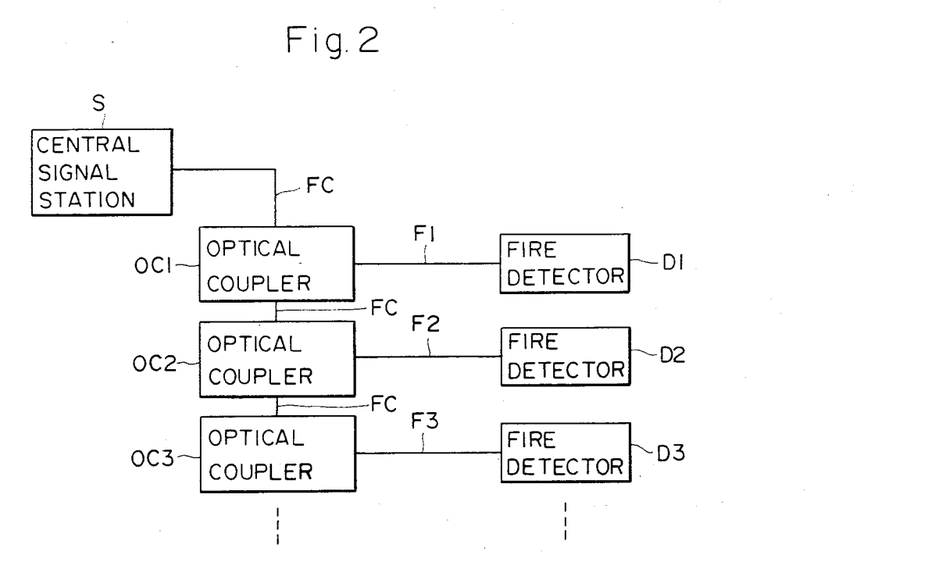
FIG. 2 is a similar block diagram showing another example of connection mode between a central signal station and fire detectors of a fire alarm system according to the present invention.

In FIG. 2, detectors $D_1, D_2, D_3 \ldots$ are connected to optical fiber cables $F_1, F_2, F_3 \ldots$ which branch off, through respective optical couplers $OC_1, OC_2, OC_3 \ldots$, from a common optical fiber cable FC connected to a central signal station. The common optical fiber cable FC includes optical fiber cables for both the power light and signal light as the optical fiber cables $F_1, F_2, F_3 \ldots$. The optical couplers $OC_1, OC_2, OC_3 \ldots$ each have a function to distribute light from the common optical fiber cable FC to the individual optical fiber cables $F_1, F_2, F_3$, and a function to introduce light from the individual optical fiber cables $F_1, F_2, F_3 \ldots$ to the common optical fiber cable FC.

However, the connection mode between the central signal station and the detectors in accordance with the present invention is not limited to those as shown in FIGS. 1 and 2. For example, the central signal station may be connected to the detectors by employing the connection mode of FIG. 1 for the power light optical fiber cables and employing the connection mode of FIG. 2 for the signal light optical fiber cables. As a modification of the mode of FIG. 2, the common optical fiber cable may be formed in a ring.

Figure 3:
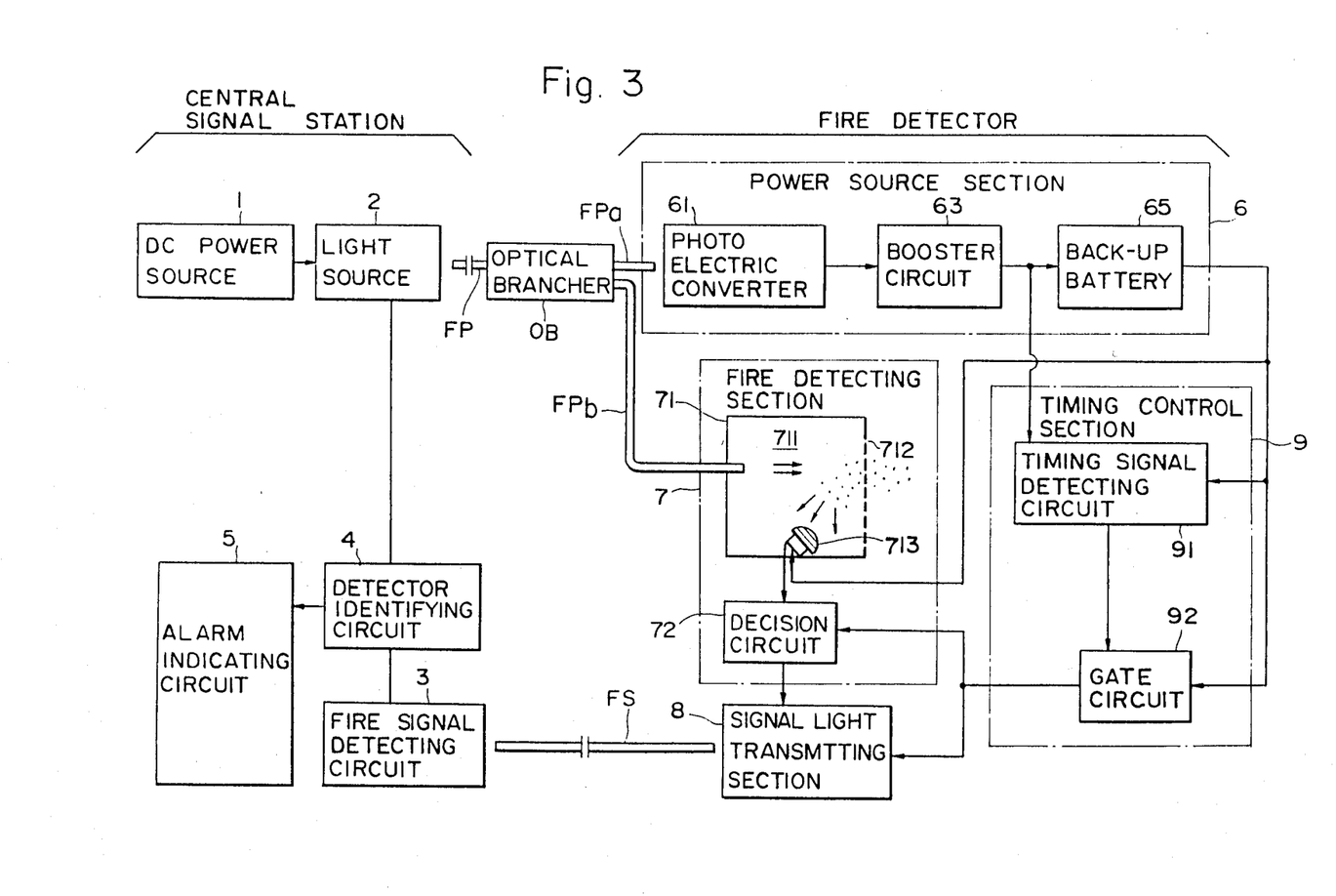
FIG. 3 is a block diagram showing a fire alarm system of the present invention which employs a detector adapted to detect a fire by scattering of smoke.

Referring now to FIG. 3, a typical example of a fiber alarm system according to the present invention will be described. In FIG. 3, only one detector is illustrated for explanation although a plurality of detectors are connected to a central signal station in the fire alarm system of the present invention.

The detectors of the fire alarm system shown in FIG. 3 are of a type which is adapted to detect a fire, utilizing a light scattering phenomenon caused by smoke. The central signal station and each of the detectors are connected to each other through a power light optical fiber cable FP and a signal light optical fiber cable FS.

The central signal station comprises a d.c. power source 1 for supplying power to the signal station and the respective detectors, a light source 2 for transmitting power light and a timing signal to the respective detectors, a fire signal detecting circuit 3 for detecting a fire signal from the detectors, a detector identifying circuit 4 for identifying a detector which has transmitted the fire signal, and an alarm indicating circuit 5 adapted to be actuated by the fire signal to make alarm indication.

Each of the detectors comprises a power source section for converting the power light to electric power so as to supply power to various sections in the detector, a fire detecting section 7 for detecting a fire in the form of light scattering caused by smoke and outputting a fire signal, a signal light transmitting section 8 for converting the fire signal to fire signal light and transmitting it to the central signal station, and a timing control section 9 for detecting the timing signal transmitted from the central signal station and controlling an operating timing of the fire detecting section 7 and the signal light transmitting section. The power source section 6 includes a photoelectric converter 61, a booster circuit 63 and a back-up battery 65, the fire detecting section 7 includes a detector 71 and a decision circuit 72, and the timing control section 9 includes a timing signal detecting circuit 91 and a gate circuit 92.

An optical brancher or an optical distributor OB is provided on the side of the detector to branch or split the power light optical fiber cable FP into an optical fiber cable FPa for converting light into electric power, which is connected to the photoelectric converter 61 and an optical fiber cable FPb for detection light, which is connected to the detector 71.

The application of the fire alarm system shown in FIG. 3 to the connection mode of FIG. 1 will now be described referring to FIGS. 4 to 6.

Figure 4:
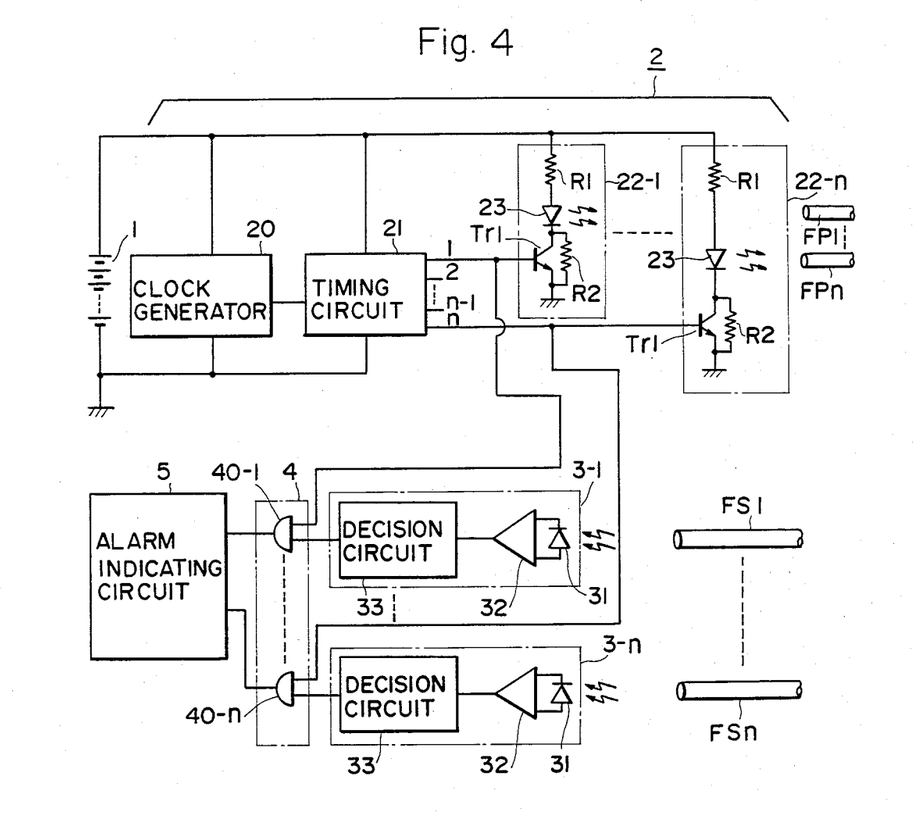
FIG. 4 is a circuit diagram of a central signal station shown in FIG. 3 which is applied to the fire alarm system having a connection mode of FIG. 1.
Figure 5:
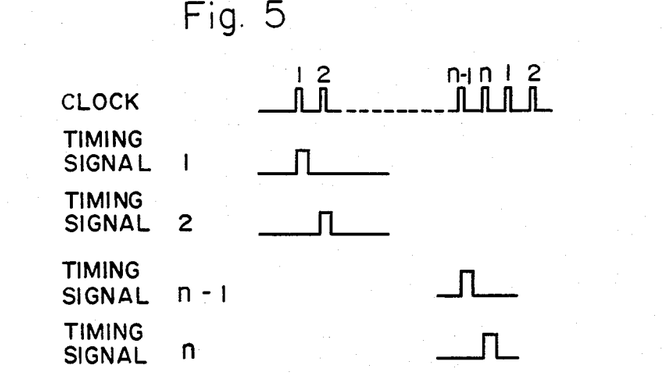
FIG. 5 is a time chart showing timing signals in the central signal station of FIG. 4.

FIG. 4 is a circuit diagram of a central signal station. A d.c. power source 1 includes a storage battery which is charged from an external a.c. power source through a rectifier and supplies power to various sections in the central signal station and to fire detectors through a light source 2. Although FIG. 4 shows only the connection of the d.c. power source 1 to the light source 2, the d.c. power source 1 also supplies power to other circuits in the central signal station.

The light source 2 includes a clock generating circuit 20 for generating a clock pulse, a timing circuit 21 for outputting a timing signal in response to the clock pulse, and a plurality of light transmitting circuits 22-1 to 22-n provided so as to correspond to respective fire detectors $D_1$ to $D_n$. The timing circuit 21 is comprised, for example, of a Johnson counter and sequentially outputs timing signals at output terminals 1 to n thereof in response to clock pulses input thereto. Each of the light transmitting circuits 22-1 to 22-n is comprised of a current limiting resistor $R_1$, a light emitting device 23 such as a high-luminance light emitting diode, and a circuit in which a transistor $TR_1$ and a bypass resistor $R_2$ are connected in parallel with each other. In each of the light transmitting circuits 22-1 to 22-n, the base of the transistor $TR_1$ is connected to the corresponding output terminal of the timing circuit 21.

The light source 2 transmits, from each of the light transmitting circuits 22-1 to 22-n, power light and timing signals to the corresponding detector $D_1$ to $D_n$ (refer to FIG. 1) through the respective optical fiber cables $FP_1$ to $FP_n$. In each of the light transmitting circuits 22-1 to 22-n, power light is transmitted by actuating, in a steady state, the light emitting device with a predetermined luminance by a current determined by the resistors $R_1$ and $R_2$. Timing signals are output sequentially at the output terminals 1 to n of the timing circuit 21 correspondingly to the clock pulses shown in FIG. 5, and sequentially turning on the transistors $Tr_1$ of the corresponding light transmitting circuits 22-1 to 22-n, respectively. In the light transmitting circuit in which the transistor $Tr_1$ is conducting, the resistor $R_2$ is shorted so that a driving current for the light emitting device 23 is increased and a light pulse having the same waveform as the timing signal shown in FIG. 5 is superposed on the power light. This operation is sequentially repeated in the light transmitting circuits 22-1 to 22-n and power light superposed with the timing signals is transmitted from the respective light transmitting circuits 22-1 to 22-n to the corresponding detectors $D_1$ to $D_n$, respectively.

The fire signal detecting circuits 3-1 to 3-n are provided for the corresponding detectors $D_1$ to $D_n$, respectively. Each of the fire signal detecting circuits 3-1 to 3-n includes a light receiving element 31 such as a photodiode which receives a fire signal transmitted from the corresponding detector $D_1$ to $D_2$ through the respective optical fiber cable $FS_1$ to $FS_n$ for signal light and converts it into an electric signal, an amplifier 32 and a decision circuit 33 for determining whether an output from the amplifier 32 is higher than a predetermined level or not, i.e., whether the signal is a fire signal or not. However, the decision circuit 33 may be omitted as the case may be.

The detector identifying circuit 4 is comprised of AND gates 40-1 to 40-n. The outputs at the respective output terminals 1 to n of the timing circuit 21 and the outputs of the respective fire signal detecting circuits 3-1 to 3-n are input to the corresponding AND gates 40-1 to 40-n, respectively. In this fire signal identifying circuit 4, only the AND gate to which both the fire signal and the timing signal has been input is opened, so that the detector which has transmitted the fire signal can be identified by the timing signal.

In the formation of the present embodiment, since the outputs of the fire signal detecting circuits 3-1 to 3-n correspond to the detectors $D_1$ to $D_n$, respectively, the detectors can also be identified by utilizing the geometric arrangement of the optical fiber cables $FS_1$ to $FS_n$ for signal light from the respective detectors $D_1$ to $D_n$. In this case, the detector identifying circuit may be omitted. However, in the case where the detector identifying circuit 4 is provided, the corresponding relations can be readily maintained between the fiber cables $FS_1$ to $FS_n$ and the respective light receiving elements of the fire signal detecting circuits 3-1 to 3-n, so as not to be out of fix correspondence at a time of connecting the optical fiber cables $FS_1$ to $FS_n$ for signal light purposes by optical connectors. Otherwise, the operation for installation and maintenance will be complicated. The detector identifying circuit 4 has a further advantage that possible false alarm can be prevented because it identifies only a signal in synchronism with the timing signal as a fire signal.

The alarm indicating circuit 5 sounds an alarm by a bell and indicates, by a lamp etc., the detector which has transmitted the fire information or the place where said detector is installed in response to the identified fire signal. The alarm indicating circuit 5 may alternatively be formed in such a manner that it sounds an alarm by an output obtained by logic sum of the outputs from the fire signal detecting circuits 3-1 to 3-n, and it indicates said detector by the output from the detector identifying circuit 4.

Figure 6:
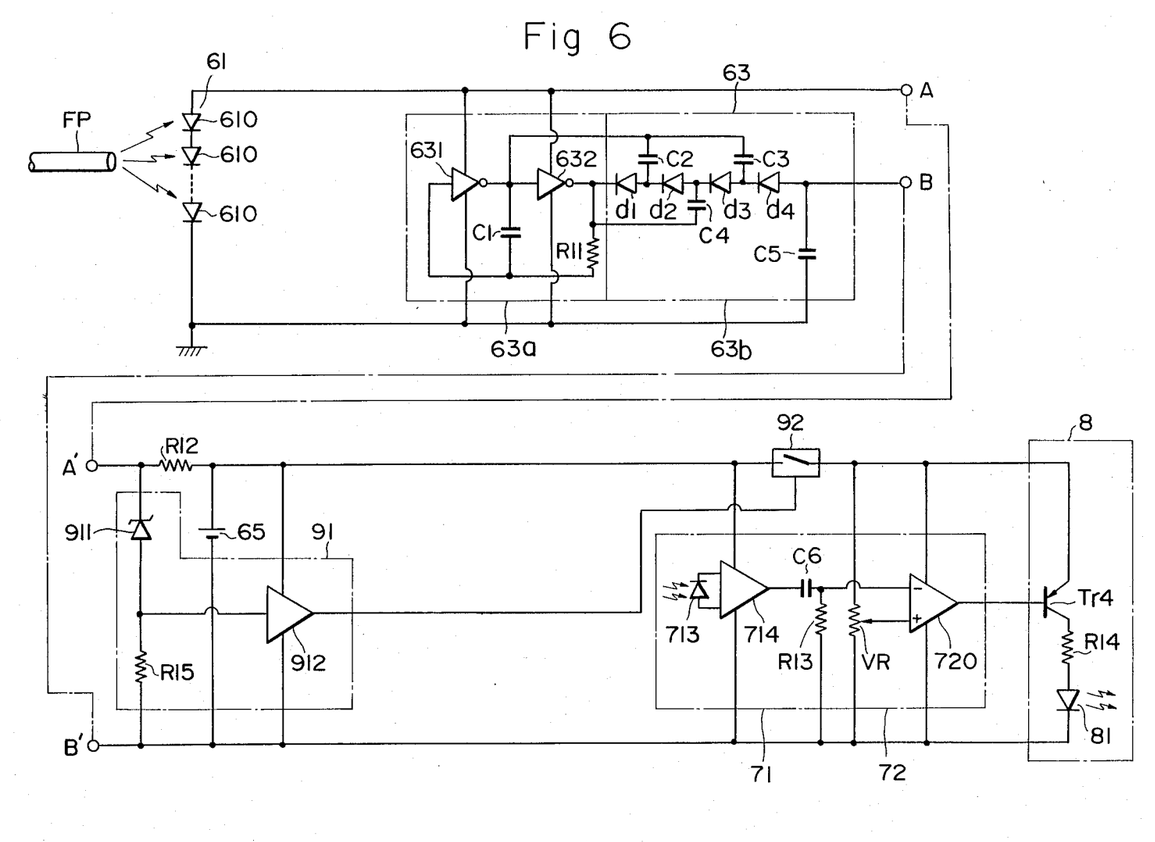
FIG. 6 is a circuit diagram showing a fire detector used in combination with the central signal station of FIG. 2.

FIG. 6 is a circuit diagram of each of the fire detectors. In FIG. 6, A and B are connected to A' and B', respectively.

The power source section 6 shown in FIG. 3 includes a photoelectric converter 61 for converting power light transmitted through the optical fiber cable FP for power light to an electric power, a booster circuit 63 for boosting the output from the photoelectric power converter 61, and a back-up battery for storing the boosted electric power as illustrated in FIG. 6.

The photoelectric converter 61 is comprised of a plurality of photovoltaic devices 610 connected in series with each other. The number of the photovoltaic devices 610 is determined considering the output voltage of the respective device 610 and the desired output voltage. Of course, one photovoltaic device will suffice as the case may be, or a plurality of series of photovoltaic devices may be used by connecting said series of the photovoltaic devices in parallel if necessary.

The booster circuit 63 includes an oscillation section 63a comprised of inverters 631 and 632, a capacitor $C_1$ and a resistor $R_{11}$, and boosting section 63b comprised of diodes $d_1$ to $d_4$ and capacitors $C_2$ to $C_5$. The booster circuit 63 sequentially effects, by the switching operation of the oscillation section 63a, charging, changing of the charging voltage and discharging of the capacitors $C_2$ to $C_5$ so as to boost the input voltage to a desired level. In the present embodiment, the output of the photoelectric power converter 61 which is about 5 V is boosted to 15 V or more. The arrangement of the booster circuit is not limited to the arrangement as described above and the booster circuit having another arrangement may be employed.

The back-up battery 65 is formed of a storage battery and floatingly operated to store the boosted electric power so that it may discharge it in the circuits of the succeeding stage when they require a large power. More specifically, at the time of generating a fire signal, large power is required by the signal light transmitting section 8 of the succeeding stage and the back-up battery 65 supplies the required power thereto. At the normal time, the output of the booster circuit 63 is used to charge the back-up battery 65 while supplying necessary power to the various sections of the detector. This arrangement can prevent such waste that large power light is supplied irrespective of the operating condition of the light transmitting section 8. This light transmitting section 8 consumes large power when actuated but it is rarely actuated. Thus, the above-mentioned arrangement enables the load of the light source 2, light-electric power converter 61 and booster circuit 63 to be lightened. Especially, the scale of the light-emitting circuit 22-1 to 22-n of the light source 2 can be small, so that the system of the present invention can be easily applied to a conventional fire alarm system.

The fire detecting section 7 includes a detector means 71 having a chamber 711 provided with smoke inlets 712 in which a tip end of the optical fiber cable FPb for detection light is disposed as illustrated in FIG. 3 and a light receiving element 713 such as a photodiode is provided, and a decision circuit 72. In FIG. 6, the light receiving element 713 is connected to an operational amplifier 714 and the output of the operational amplifier 714 is input to the decision circuit 72. The decision circuit 72 includes a differentiating circuit comprised of a capacitor $C_6$ and a resistor $R_{13}$, a reference voltage circuit formed of a variable resistor VR and a comparator 720. This decision circuit 72 decides whether the output from the light receiving element 713 is a fire signal or not.

Since the light irradiated from the optical fiber cable FPb for detection light into the chamber 711 has a waveform of power light and a timing signal superposed thereon as described above, it changes in luminance periodically. However, according to the present invention, the reference voltage circuit and the comparator 720 are driven in synchronism with the timing signal by a timing control section 9 as will be described in detail later, and the smoke detection is carried out at a time of the highest luminance when the timing signal is superposed on the power light. Thus, the smoke detection is made with high accuracy without being subjected to the influence of the change in luminance.

The fire detecting section 7 of the present invention is so formed that when smoke enters the chamber 711, the light from the optical fiber cable FPb is scattered by the smoke so as to be incident upon the light receiving element 713 and converted into a voltage signal by the operational amplifier 714, and the resultant voltage signal is input to the comparator 720 through the differentiating circuit where the signal is compared with the reference signal and a fire signal is output when said signal is higher than a predetermined level.

Alternatively, the detector device 71 may be so formed that the light from the optical fiber cable FPb is input to the light receiving element 713 under a normal condition and the light to be input thereto is attenuated by smoke entering the chamber 711. In this case, the decision circuit 72 outputs a fire signal when the output voltage from the detector device 71 is lower than the predetermined level.

As illustrated in FIG. 6, the signal light transmitting section 8 is comprised of a light emitting element 81 such as a light emitting diode, a transistor $Tr_4$ and a resistor $R_{14}$ which are connected in series with each other. The transistor $Tr_4$ is controlled so as to be turned on or turned off by the comparator 720. The transistor $Tr_4$ is rendered conductive to drive the light emitting element 81 when a fire signal is output from the comparator 720. The fire signal light from the light emitting element 81 is transmitted to the central signal station via the optical fiber cable FS for signal light. Since the signal light transmitting section 8 emits light pulsively in synchronism with the timing signals, the luminance of the signal light can be high and the entire power consumption can be reduced.

The timing control section 9 includes a timing signal detecting circuit 91 and a gate circuit 92 as shown in FIG. 3. The details of the timing signal detecting circuit 9 is shown in FIG. 6, wherein the circuit 9 is comprised of a Zener diode 911 connected in series with a resistor $R_{15}$ and an amplifier 912. The circuit 9 monitors the output voltage from the booster circuit 63 and detects a pulse of the timing signal superposed on the power light. The gate circuit 92 is formed, for example, of a C-MOS switch and inserted and connected in a power line between the back-up battery 65 and the succeeding circuits. In the embodiment as illustrated, the gate circuit 92 is connected before the decision circuit 72 and the signal light transmitting section 8.

In the timing control section 9, when the output voltage at the output terminal of the booster circuit 63 reaches and exceeds a predetermined voltage, the Zener diode 911 is rendered conductive and the input voltage of the amplifier is raised. Thus, a timing signal is detected and the gate circuit 92 is closed by the timing signal. As a result, electric power is supplied to the decision circuit 72 and the signal light transmitting section 8. The reason why power is intermittently supplied to the decision circuit 72 is to render the circuit conductive only when required because relatively large power is consumed for setting the reference voltage and to store power in the back-up battery 65 when the circuit 72 is not conducting.

Although the timing signal detecting circuit 91 monitors the output voltage of the booster circuit 63 in the embodiment as illustrated, it may alternatively monitor the output voltage of the photoelectric converter 61 to detect a timing signal.

The application of the embodiment illustrated in FIG. 3 to a fire alarm system having a connection mode of FIG. 2 will now be described referring to FIGS. 7 to 10.

Figure 7:
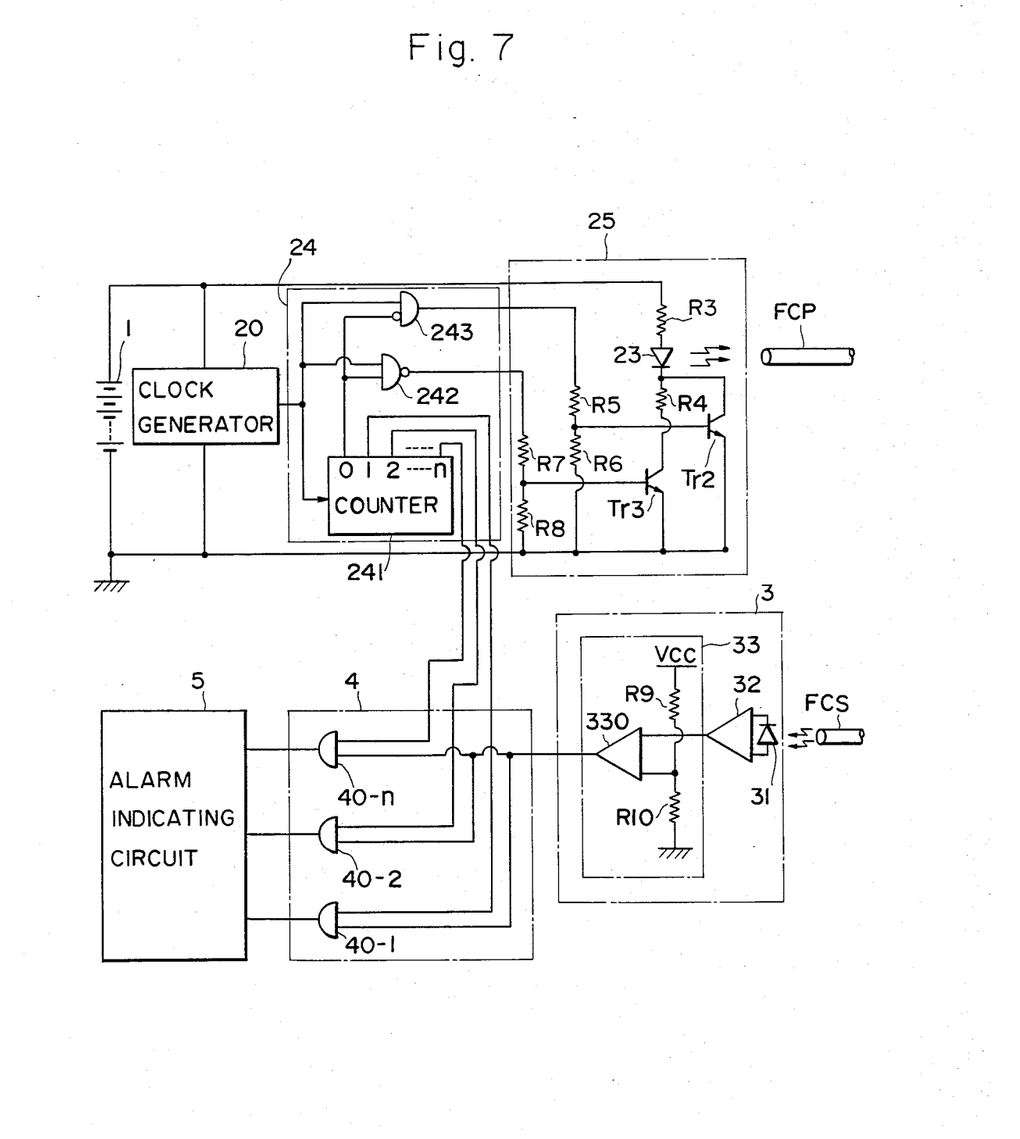
FIG. 7 is a circuit diagram of a central signal station shown in FIG. 3 which is applied to the fire alarm system having a connection mode of FIG. 2.

FIG. 7 is a circuit diagram of a central signal station. The central signal station of FIG. 7 has the same formation as of the central signal station illustrated in FIG. 4 except for a light source, a fire signal detecting circuit 3 and a detector light identifying circuit 4.

The light source includes a clock generator 20, a timing circuit 24 and a light emitting circuit 25. The timing circuit 24 is comprised of a counter 241 such as a Johnson counter which outputs timing signals sequentially at output terminals 0 to n in response to clock pulses input thereto from the clock generator 20, NAND gate circuit 242 adapted to be input with the output of a terminal 0 of the counter 241 and a clock pulse, and an AND gate circuit 243 adapted to be input with a signal which has an inverted waveform of the output of the terminal 0 of the counter 241 and the clock pulse. In the light emitting circuit 25, a current regulating resistor $R_3$, a light emitting element 23 such as a light emitting diode, a resistor $R_4$ and a transistor $Tr_3$ are connected in series with each other and a transistor $Tr_2$ is connected in parallel with the transistor $Tr_3$ and resistor $R_4$. To the base of the transistor $Tr_2$ is input an output from the AND gate circuit 243 after it has been voltage-divided by resistors $R_5$ and $R_6$. To the base of the transistor $Tr_3$ is input an output from the NAND gate circuit 242 after it has been voltage-divided by resistors $R_7$ and $R_8$.

The characteristic feature of this light source is such that a single light emitting circuit 25 is provided corresponding to a common optical fiber cable FCP for power light and the light emitting circuit 25 outputs a series of timing signals to be superposed on power light which includes operating timing signals for the respective fire detectors and a signal indicating the starting point of the series of operating timing signals.

Figure 8:
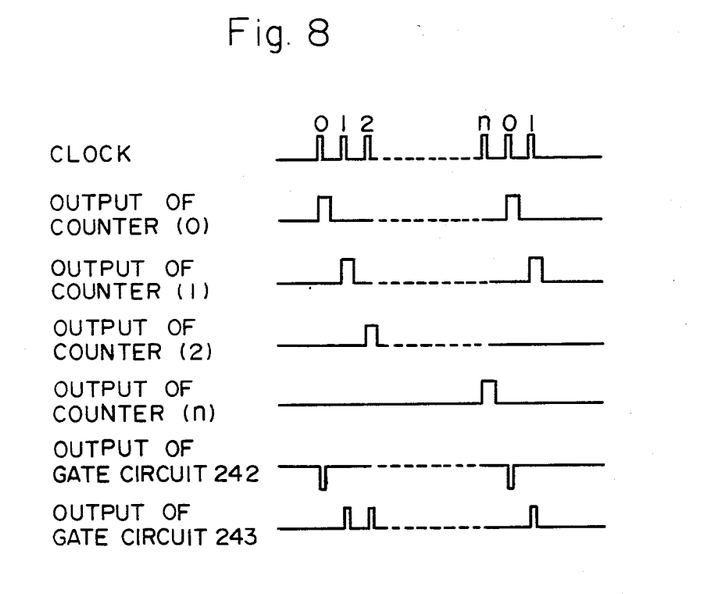
FIG. 8 is a time chart showing timing signals in the central signal station of FIG. 7.

In the light source, clock pulses are supplied from the clock generator 20 as shown in FIG. 8 and timing pulses are output sequentially from the output terminals 0 to n of the counter 241. When a pulse is output from the terminal 0 of the counter 241, the NAND gate circuit 242 which is simultaneously input with a clock pulse generates an output of a low level as shown in FIG. 8. On the other hand, the AND gate circuit 243 is input with a clock pulse and with an inverted pulse from the terminal 0, so that the output of the AND gate is at a low level. When timing pulses are sequentially generated from the terminals 1 to n of the counter 241, since the output of the terminal 0 is at a low level, the output from the NAND gate circuit 242 becomes high and the output of the AND gate circuit 243 becomes high upon every input of the clock pulse. And when the timing pulse is output from the terminal 0 of the counter 241, the light source is reset to the initial state as described above and it repeats the same operation periodically.

In the light emitting circuit 25 which receives the outputs from the gate circuits 242 and 243, when the output from the NAND gate circuit 242 is high, i.e., during a time when the timing pulses are output from the terminals 1 to n of the counter 241, the transistor $Tr_3$ is in a conductive state and the light emitting element 23 is driven by a current determined by the resistors $R_3$ and $R_4$ to emit power light. During this time, a timing pulse is generated upon every input of the clock pulse and correspondingly the output of the AND gate circuit 243 becomes pulsively high and the transistor $Tr_2$ is pulsively rendered conductive. The driving current for the light emitting element 23 is increased upon conducting of the transistor $Tr_2$ and the luminance of the light emitted is increased accordingly. Thus, a series of operating timing signals are superposed on the power light as shown in FIG. 10.

Figure 10:
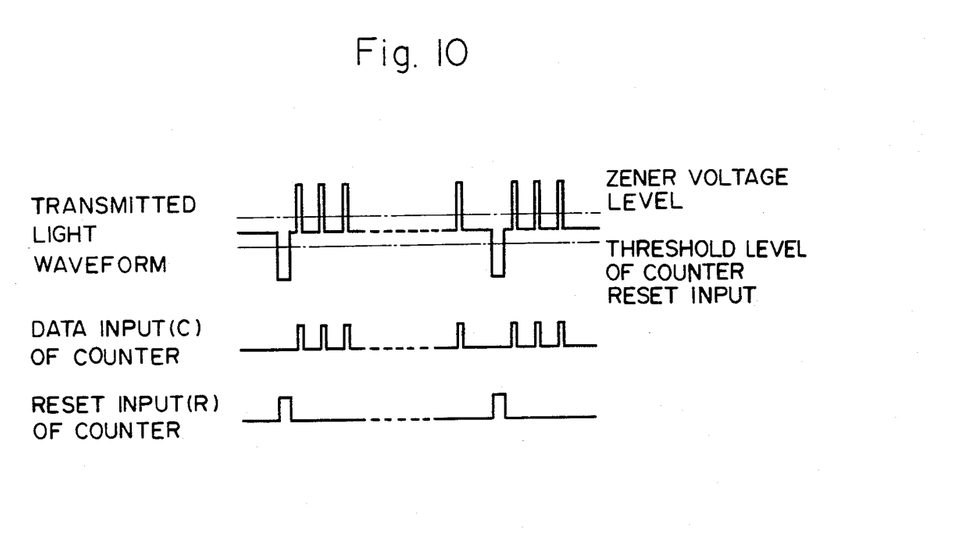
FIG. 10 is a time chart showing timing signals in the detector shown in FIG. 9.

When a pulse is output from the terminal 0 of the counter 241, both of the outputs from the NAND gate circuit 242 and the AND gate circuit 243 become low and both of the transistors $Tr_2$ and $Tr_3$ are rendered non-conductive, so that a signal for indicating the starting point of the series of operating timing signals is superposed as a negative pulse on the power light as shown in FIG. 10. The timing signal for indicating the starting point is used as a control signal of a timing control section 9 as will be described later. In this connection, it is to be noted that the transistor $Tr_3$ is not always required to be cut-off completely, it suffices if the driving current for the light emitting element 23 is lowered to below a predetermined level.

In this embodiment, a single fire signal detecting circuit 3 is provided so as to correspond to the common optical fiber cable FCS for signal light. The formation of the fire signal detecting circuit 3 is substantially the same as that of the fire signal detecting circuit as shown in FIG. 4. More specifically, it consists of a light receiving element 31, an operational amplifier 32 and a decision circuit 33. The decision circuit 33 is comprised of a reference voltage circuit constituted of resistors $R_9$ and $R_{10}$ and a comparator 330. This decision circuit, however, may be omitted. The fire signal detecting circuit 3 is adapted to receive a fire signal light from every detector connected to the optical fiber cable FCS for signal light.

The detector identifying circuit 4 has AND gate circuits 40-1, 40-2, ... 40-n corresponding to the terminals 1 to n of the counter 241, respectively, and identifies a detector which has generated a fire signal by "and" of a timing signal and a fire alarm signal from the fire signal detecting circuit 3. According to this identification, the alarm indicating circuit 5 is actuated to sound an alarm and indicate the place where a fire has broken out.

Alternatively, the alarm indicating circuit 5 may be so formed that it is directly input with an output from the fire signal detecting circuit 3 to sound an alarm and is operated by an output from the detector identifying circuit 4 to indicate the place of fire.

Figure 9:
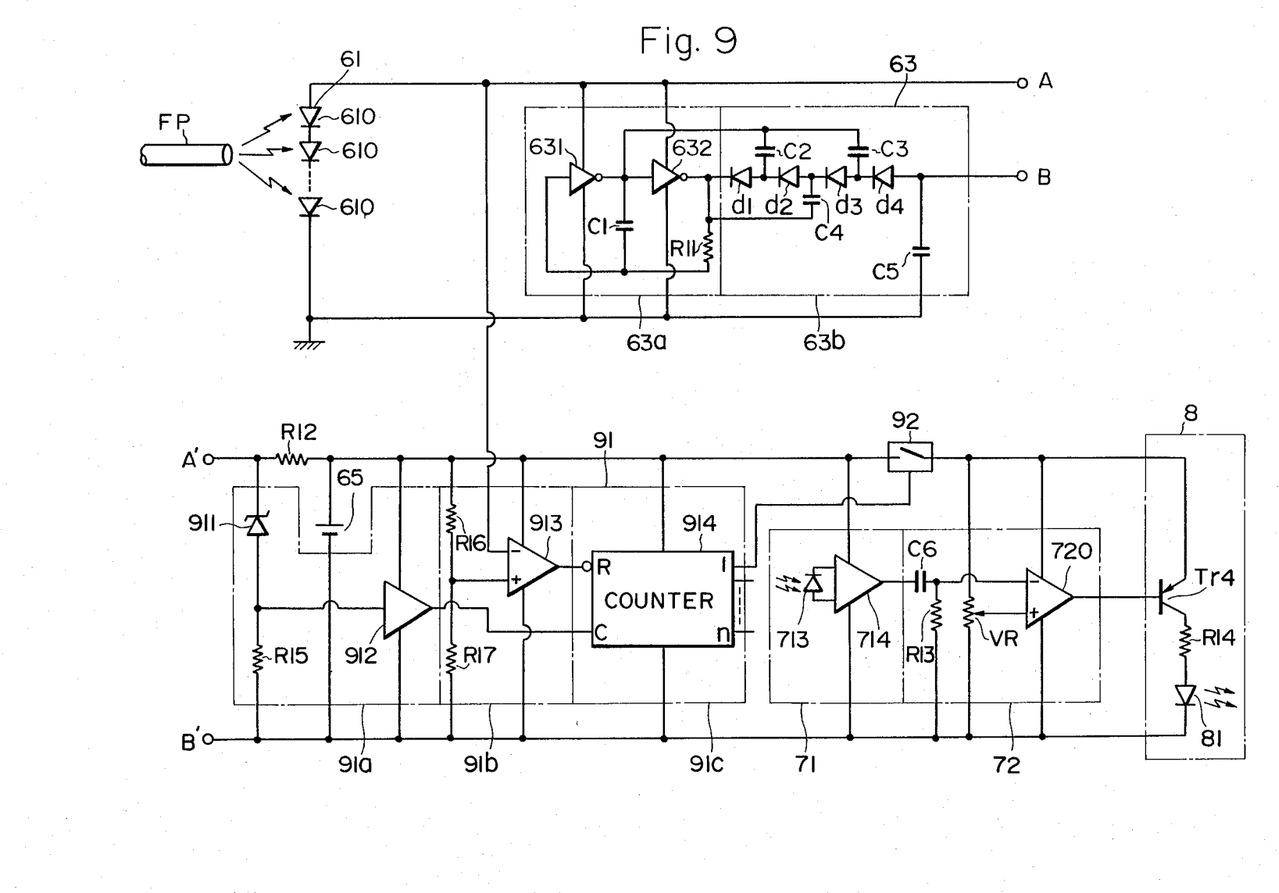
FIG. 9 is a circuit diagram of the fire detector shown in FIG. 5.

FIG. 9 is a circuit diagram of the fire detector. In FIG. 9, A and B are connected to A' and B', respectively.

The fire detector of FIG. 9 has substantially the same formation as that of the detector shown in FIG. 6 except for a timing control section. Therefore, only the timing control section will now be described.

As shown in FIG. 9, the timing control section is comprised of a timing signal detecting circuit 91 and a gate circuit 92. The timing signal detecting circuit 91 includes an operating timing signal detecting circuit 91a for detecting a series of operating timing signals for the respective detectors, a starting signal detecting circuit 91b for a detecting signal indicating the starting point of the operating timing signals and a specific timing extracting circuit 91c for extracting a specific timing signal for a relevant detector from said series of operating timing signals.

The operating timing signal detecting circuit 91a includes a Zener diode 911, a resistor $R_{15}$ and an amplifier 912 and has substantially the same arrangement and operation as that of the timing signal detecting circuit 91 shown in FIG. 6. Although the detecting circuit 91a monitors the output from the booster circuit 63 to detect an operating timing signal, it may alternatively monitor the output from the photoelectric converter 61.

The starting signal detecting circuit 91b includes a reference voltage circuit consisting of resistors $R_{16}$ and $R_{17}$ and a comparator 913. The comparator 913 compares the output voltage of the light-electric power converter 61 and the reference voltage and generates an output of low level when said output voltage is lower than a predetermined level.

The specific timing detecting circuit 91c is formed of a counter 914 such as a Johnson counter and receives, at a data input terminal C thereof, an output from the operating timing detecting circuit 91a and, at a reset terminal R thereof, an inverted output of the starting signal detecting circuit 91b. The output of the counter 914 is connected to the gate circuit 92 at a terminal selected from the terminals 1 to n so as to correspond to the relevant detector.

The gate circuit 92 is inserted and connected in a power line derived from the back-up battery 65 and rendered to be opened or closed in response to the output from the counter to supply power to circuits of the succeeding stages and control the operation timing of the circuits.

This timing control circuit detects, by the starting signal detecting circuit 91b, a starting signal from the timing signal of the light waveform as shown in FIG. 10 which is transmitted from the central signal station to reset the counter 914 as shown in FIG. 10. The timing control circuit then detects operating timing signals by the operating timing signal detecting circuit 91a to input the detected signals to the counter 914 as shown in FIG. 10 and counts the signals. The counter 914 outputs pulses sequentially at the terminals 1 to n according to the number of pulses input thereto. The gate circuit 92 is closed only when a pulse is output at the terminal to which the gate circuit is connected, e.g., the terminal 1 in the case as illustrated. Thereafter, when the starting signal detecting circuit 91b detects the starting signal, the counter 914 is reset.

As described above, although the operating timing signals are transmitted in series to the detectors from the central signal station in the present embodiment, the detectors are each so formed that the series of the operating timing signals are counted, on the basis of the starting signal transmitted before the operating timing signals, until the count reaches the identification number assigned to the respective detectors. Therefore, the timing signals can be transmitted through the common optical fiber cable. In addition, since smoke detection is carried out in response to the timing signal in the present embodiment, power consumption can be reduced as in the embodiment of FIG. 6.

Figure 11:
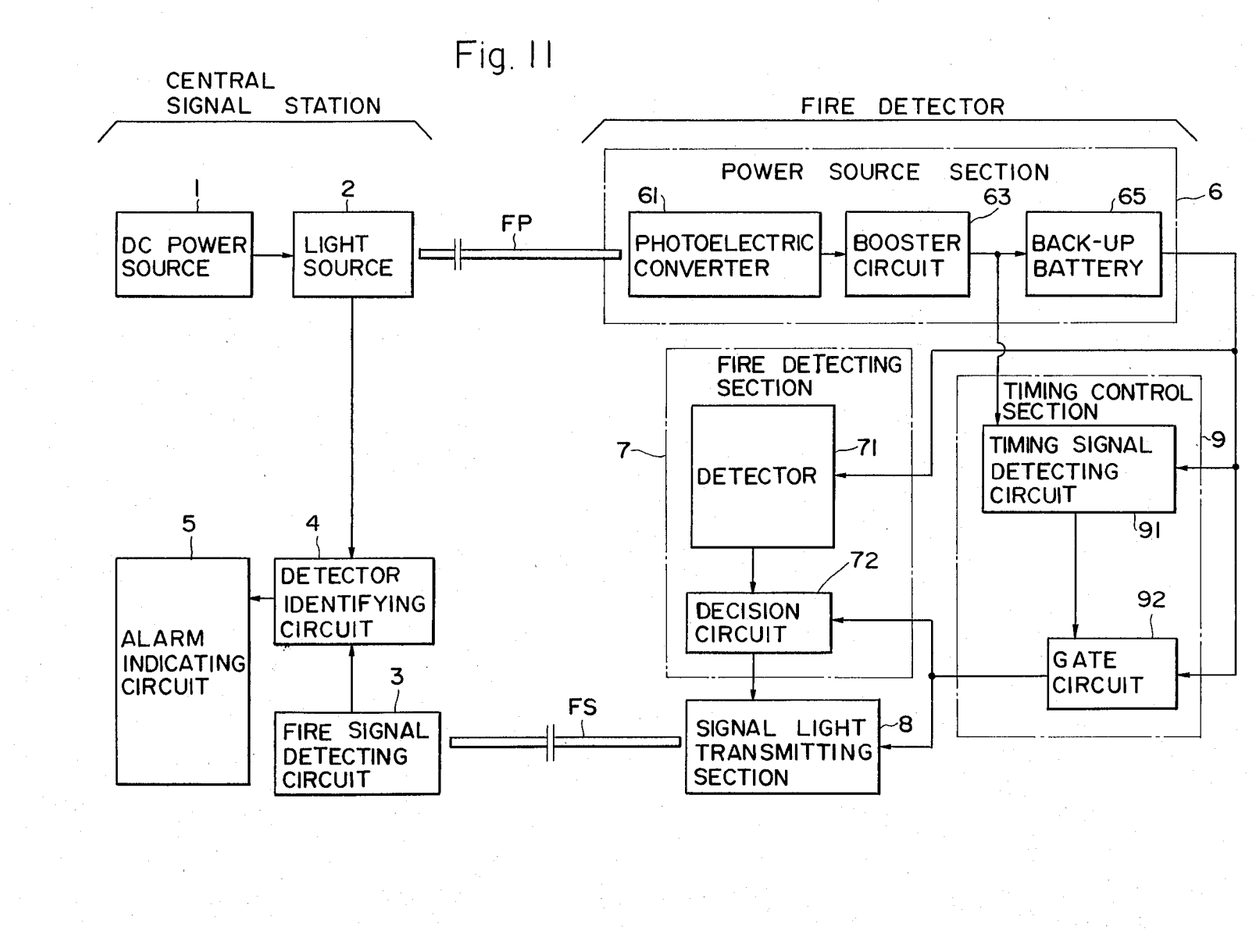
FIG. 11 is a block diagram of a fire alarm system according to the present invention which employs fire detectors each adapted to detect a fire by a change in ion current caused by smoke.

FIG. 11 illustrates a further embodiment of the present invention.

A fire alarm system of FIG. 11 has, at a central signal station, a d.c. power source 1, a light source 2, a fire signal detecting circuit 3, a detector identifying circuit 4 and an alarm indicating circuit 5, and, at each of detectors, a power source section 6, a fire detecting section 7, a signal light transmitting section 8 and a timing control section 9. The formation of this fire alarm system is substantially the same as that of the fire alarm system illustrated in FIG. 3 except for a detector device 71 of the fire detecting section.

The detector device 71 has a radiation source (not shown) for ionizing air in a chamber and it is adapted to detect a change in an ion current caused by smoke. As this detector includes no optical elements, an optical fiber cable FP for power light is not branched into the fire detecting section 7. The detector 71 is driven by electric power from the power source section 6.

The fire alarm system of FIG. 11 is applicable to either of the connection modes shown in FIGS. 1 and 2. In these cases, the details of the circuit arrangement may be substantially the same as those of FIGS. 4 and 6 and FIGS. 7 and 9, respectively, except for the detector 71.

The detectors illustrated in FIG. 3 and FIG. 11 may be used in combination as the detectors $D_1$ to $D_n$ in FIGS. 1 and 3. In these cases, two types of detectors may be provided at the same installation spot and the central signal station may be adapted to additionally have a function to decide a fire only when both the detectors are actuated so as to avoid a false alarm.

Figure 12:
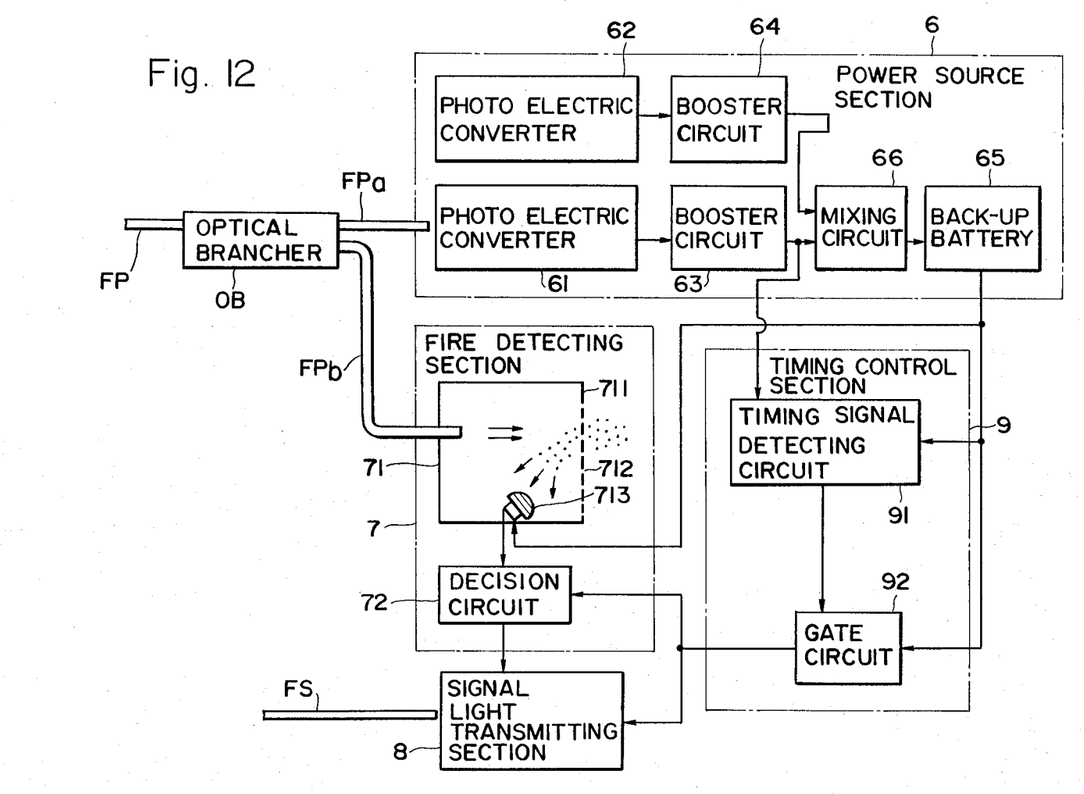
FIG. 12 is a block diagram of a fire detector which has a photoelectric converter in addition to the arrangement of FIG. 3.
Figure 13:
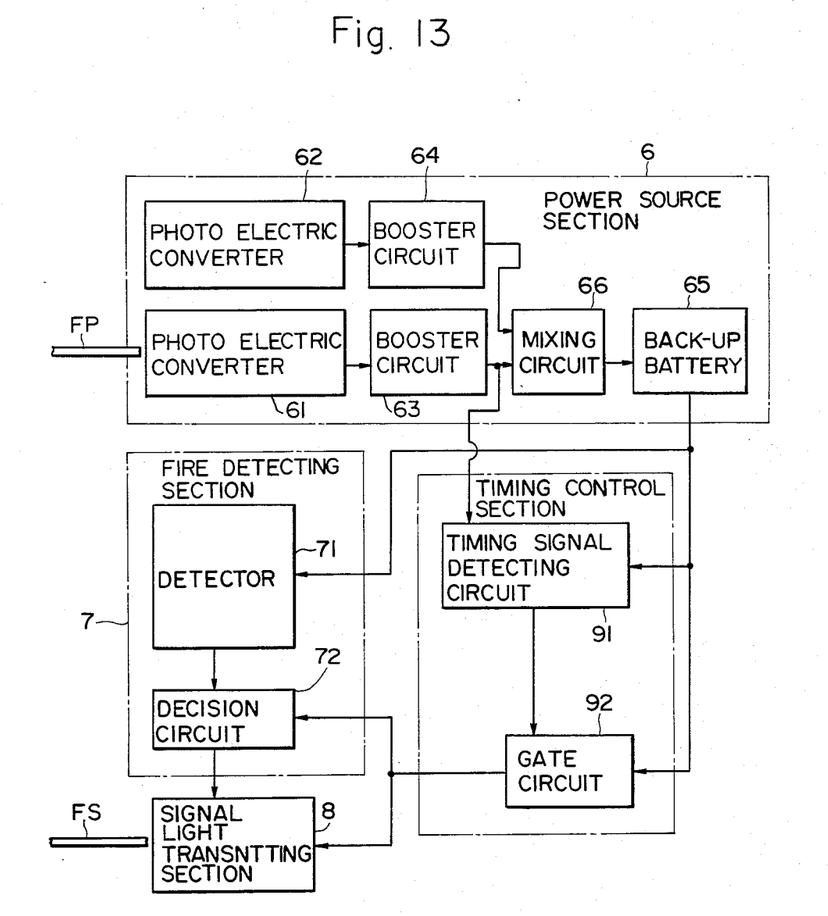
FIG. 13 is a similar block diagram of a fire detector which has a photoelectric converter in addition to the arrangement of FIG. 11.

Although power required for the detectors are all supplied, in the form of power light, from the central signal station in the foregoing embodiments, the detectors may each have a means for generating power as illustrated in FIGS. 12 and 13.

FIG. 12 shows an example in which such a means for generating power is provided in the detector of FIG. 3, while FIG. 13 shows an example wherein the means is provided in the detector of FIG. 11. In either case, power source section 6 has the same formation.

The power source section 6 includes a photoelectric converter 61, a booster circuit 63 and a back-up battery 65. It further includes another photoelectric converter 62 for external light and another booster 64. The output from the booster circuit 64 is input to the back-up battery 65 through a mixing circuit 66. The photoelectric converter 62 for external light has photovoltaic elements disposed on the periphery of the detector or adjacently to the detector for converting ambient light into electric power.

Since this photoelectric converter 62 for external light can supply most of charging power for the back-up battery 65, an amount of power light to be transmitted from the central signal station can be reduced.

The features of the present invention are summarized as follows:

(1) The central signal station and the detectors can be connected by optical fiber cables without using additional line, so that a fire alarm system with optical fiber cables can be realized without rendering the entire arrangements of the system to be complicated.

(2) Since the power required by the detectors are supplied from the central signal station in the form of power light and a fire signal is transmitted from the detector in the form of light, a fire alarm system of high reliability which is not subjected to influence of an external electrical noise can be realized.

(3) Since a timing signal superposed on power light is transmitted to the detector for controlling an operation timing, a detector which has generates a fire signal can be identified easily, and power consumption by the detector can be reduced, enabling the detector to be operated by weak light.

I claim:

1. A fire alarm system comprising fire detectors for detecting a physical change caused by fire and a central signal station connected to the fire detectors so as to receive a first signal from the detectors to raise an alarm, said central signal station and said fire detectors being connected to each other through optical fiber cables; said central signal station including a light source for transmitting power light superposed with timing signals to said detectors through said optical fiber cables, a fire signal detecting circuit for detecting a fire signal by converting a fire signal light transmitted from a detector through said optical fiber cables into an electric signal, an alarm indicating circuit to be operated by the fire signal for giving the alarm of fire and a d.c. power source for supplying power to the light source and the circuits in the central signal station; said light source of the central signal station including a plurality of light emitting circuits for emitting power light via respective optical fiber cables to respective detectors, and a timing circuit for sequentially outputting timing signals for the respective light emitting circuits so as to superpose the timing signals on the power light; said fire detectors each including a power source section comprised of a photoelectric converter for converting said power light into electricity, a booster circuit for boosting the output from said photoelectric converter and a back-up battery, a fire detecting section for detecting a physical change caused by fire and outputting a fire signal, a fire signal transmitting section for converting said fire signal into fire signal light and transmitting said fire signal light to the central signal station and a timing control section for detecting said timing signals and controlling the operation timing of said fire detecting section and said first signal light transmitting section;

said timing control section of each of the detectors including a timing signal detecting circuit and a gate circuit inserted and connected in a power line connected between said back-up battery and said signal light transmitting section and opened or closed in response to the detected timing signal to connect or disconnect the power supply to the succeeding circuits for controlling the operation timing thereof.

2. A fire alarm system as claimed in claim 1, wherein said power source section of each of the fire detectors includes a photoelectric converter for external light and a booster circuit for boosting the output from said photoelectric converter and wherein an output of said booster circuit is connected to said back-up battery through a mixing circuit.

3. A fire alarm system as claimed in claim 1, wherein said central signal station further includes a detector identifying by said timing signal circuit for identifying the detector which has generated a fire signal.

4. A fire alarm system as claimed in claim 3, wherein said power source section of each of the fire detectors includes a photoelectric converter for external light and a booster circuit for boosting the output from said photoelectric converter and wherein an output of said booster circuit is connected to said back-up battery through a mixing circuit.

5. A fire alarm system comprising fire detectors for detecting a physical change caused by fire and a central signal station connected to the fire detectors so as to receive a fire signal from the detectors to raise an alarm, said fire detectors being connected, through optical couplers, to a common optical fiber cable which is in turn connected to the central signal station; said central signal station including a light source for transmitting power light superposed with timing signals to said detectors through the optical fiber cable, a fire signal detecting circuit for detecting a fire signal by converting a fire signal light transmitted from a detector through said optical fiber cable into an electric signal, an alarm indicating circuit to be operated by the fire signal for giving the alarm of fire and a d.c. power source for supplying power to the light source and the circuits in the central signal station; said light source of the central signal station including a light emitting circuit for emitting power light to the detectors and a timing circuit for outputting, to the light emitting circuit, timing signals including a series of operation timing signals for the respective detectors and a signal indicating the starting point of the operation timing signals; said central signal station including a detector identifying circuit for identifying by said timing signals the fire detector which has generated a fire signal; said fire detectors each including a power source section comprised of a photoelectric converter and a back-up battery, a fire detecting section for detecting a physical change caused by fire and outputting a fire signal, a fire signal transmitting section for converting said fire signal into fire signal light and transmitting said fire signal light to the central signal station and a timing control section for detecting said timing signals and controlling the operation timing of said fire detecting section and said fire signal light transmitting section, said timing control section of each of the detectors incluidng a timing signal detecting circuit comprised of a circuit for detecting the operation timing signal, a circuit for detecting the signal indicating the starting point of the series of the operation timing signals and a circuit adapted to be reset by the signal indicating the starting point of the series of operation timing signals and extract a timing signal allotted to the relevant detector from said series of operation timing signals, and a gate circuit inserted and connected in a power line which is connected between said back-up battery and said signal light transmitting section to be opened or closed in response to the detected timing signal and connect or disconnect the power supply to the succeeding circuits for controlling the operation timing thereof.

6. A fire alarm system as claimed in claim 5, wherein said timing circuit is formed of a circuit which outputs the series of operation timing signals for the respective detectors in the form of pulses for increasing the luminance of the power light and outputs the signal indicating the starting point of said series of operation timing signals in the form of a pulse for decreasing the luminance of the power light.

7. A fire alarm system as claimed in claim 6, wherein said power source section of each of the fire detectors includes a photoelectric converter for external light and a booster circuit for boosting the output from said photoelectric converter and wherein an output of said booster circuit is connected to said back-up battery through a mixing circuit.

8. A fire alarm system as claimed in claim 5, wherein said power source section of each of the fire detectors includes a photoelectric converter for external light and a booster circuit for boosting the output from said photoelectric converter and wherein an output of said booster circuit is connected to said back-up battery through a mixing circuit.

9. A fire alarm system as claimed in any one of claims 1–8, wherein detecting section of each of fire detectors is adapted to detect a fire by scattering of light caused by smoke, and which includes an optical brancher or optical distributor for branching or distributing the optical fiber cable for transmitting the power light to said photoelectric converter and said fire detecting section.

10. A fire alarm system as claimed in any one of claims 1–8, wherein said fire detecting section of each of the fire detectors is adapted to detect a fire by attenuation of light caused by smoke, and which includes an optical brancher or optical distributor for branching or distributing the optical fiber cable for transmitting the power light to said photoelectric converter and said fire detecting section.

11. A fire alarm system as claimed in any one of claims 1–8, wherein said fire detecting section of each of the fire detectors which is adapted to detect a fire by a change in ion current caused by smoke.

* * * * *